(12) United States Patent
Suzuki et al.

(10) Patent No.: US 7,589,932 B2
(45) Date of Patent: Sep. 15, 2009

(54) FILTERED AIR SEPARATOR FOR DISK DRIVE

(75) Inventors: Takao Suzuki, Kanagawa (JP); Akihiko Aoyagi, Kanagawa (JP); Satoshi Hayakawa, Kanagawa (JP); Kohichi Takeuchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 417 days.

(21) Appl. No.: 11/317,187

(22) Filed: Dec. 22, 2005

(65) Prior Publication Data
US 2006/0139797 A1    Jun. 29, 2006

(30) Foreign Application Priority Data
Dec. 27, 2004    (JP) .............................. 2004-376848

(51) Int. Cl.
    *G11B 33/14*    (2006.01)
(52) U.S. Cl. .................................................... 360/97.02
(58) Field of Classification Search ............. 360/97.02, 360/97.03, 97.04, 97.01, 98.01
    See application file for complete search history.

(56) References Cited
U.S. PATENT DOCUMENTS 4,369,475 A  *  1/1983  Ho et al. .................. 360/97.02
4,626,941 A  *  12/1986  Sawada et al. ........... 360/99.03
4,710,830 A  *  12/1987  Imai et al. ................ 360/97.03
6,709,498 B2 *  3/2004  Tuma .......................... 96/134

FOREIGN PATENT DOCUMENTS

JP    05-347089    12/1993

* cited by examiner

*Primary Examiner*—Jefferson Evans
(74) *Attorney, Agent, or Firm*—Townsend and Townsend and Crew LLP; Darren Gold

(57) ABSTRACT

Embodiments of the invention provide a disk drive capable of reducing vibrations of a disk generated by an airflow produced as the disk rotates. In one embodiment, a disk drive comprises: a rotary magnetic disk, a base for housing the magnetic disk, a top cover for closing the disk in the base to form an enclosure, a circulating filter arranged externally of the magnetic disk to trap dust within the enclosure, and an airflow guide for guiding an airflow which flows out of the circulating filter more to the center side than to the outer edge portion of the magnetic disk. Further, a shut out portion is provided in the vicinity of the outer edge portion of the magnetic disk to shut out an airflow which flows out in the vicinity of the outer edge portion.

20 Claims, 11 Drawing Sheets

(a)

(b)

(c)

(d)

(a)

(b)

(a)

(b)

FILTERED AIR SEPARATOR FOR DISK DRIVE

CROSS-REFERENCES TO RELATED APPLICATIONS

This application claims priority from Japanese Patent Application No. JP2004-376848, filed Dec. 27, 2004, the entire disclosure of which is incorporated herein by reference.

BACKGROUND OF THE INVENTION

The present invention relates to a disk drive for reducing the flutter generated by an airflow as the disk rotates.

An information storing and reproducing device using various types of media such as optical disks and magnetic tapes are known in the art. Among them, hard disk drives (HDDs) have become popular as storage devices for computers to such an extent that they are one type of the storage device indispensable for today's computers. Further, not limited to computers, HDDs are expanding more and more in application because of its excellent characteristics. For example, HDDs are used for moving picture recording/reproducing devices, car navigation systems, cellular phones, removable memories used in digital cameras and so on.

The hard disk drive comprises a magnetic disk for storing data, a head for performing data read and/or write between it and the magnetic disk, and an actuator for moving the head to a desired position on the magnetic disk. The actuator is driven by a voice coil motor and pivotally moved about a pivot shaft to thereby move in the radial direction on the rotary magnetic disk. Thus, the head can get access to a desired track formed on the magnetic disk to perform read/write data.

Incidentally, the interface of the head and disk within a mechanism portion (HDA: Hard Disk Assembly) is closed by the base and top cover of HDD. Therefore, it is necessary to remove lubrication oil leaked out of the actuator for driving the magnetic head, or dust possibly generated due to the wear of the drive mechanism. Accordingly, a circulating filter for collecting the dust is arranged where a pressure difference within the HDA is generated. When the magnetic disk rotates, an airflow is generated at the outer edge portion of the disk in the rotating direction of the disk, and the airflow passes through the circulating filter, thereby removing dust contained in the airflow.

A higher degree of tracking accuracy is desired as the shorter pitch of the recording track of HDD's progresses, but the vibration of the magnetic disk at the time of rotation greatly affects the accuracy of the tracking operation. In the HDA, an airflow smoothly flows as the disk rotates by a flow straightening wall provided along the outer edge portion of the disk. This flow straightening wall is preferably as continuous as possible, whereby the vibration of the disk generated by the airflow can be suppressed. However, when the above-described circulating filter is arranged, for example, at a corner of the HDA or the like, the flow straightening wall is normally discontinuous at the corner. This is because there is needed an inlet for causing an airflow to flow into the circulating filter, and an outlet for causing an airflow to flow out from the circulating filter.

In the hard disk drive described in Patent Document 1 (Japanese Patent Laid-Open No. Hei 5-347089), there is provided a guide portion for guiding an inflow airflow so as to produce a height between the disks. The hard disk drive according to the technology described in Patent Document 1 is shown in FIGS. 12(a) and 12(b). As shown in FIGS. 12(a) and 12(b), in the hard disk drive, a gap 903 is provided between an outer edge portion 901a and a flow straightening wall 902 of a hard disk 901. An airflow which flows through a dust collecting filter 904 flows out along the lower surface of the hard disk 901, and flows out to the upper surface of the hard disk 901 passing between the edge surface of the outer edge portion 901a of the hard disk 901 and the gap 903. Therefore, the hard disk 901 vibrates when the airflow moves toward the upper surface of the hard disk 901, and hits the edge surface of the outer edge portion 901a of the hard disk 901. According to the technology of Patent Document 1, because the rising airflow cannot be controlled positively, it is not possible to positively suppress the vibration, with respect to the hard disk, generated by the rising airflow.

BRIEF SUMMARY OF THE INVENTION

The present invention has been accomplished to solve such a problem as noted above, and a feature of the invention is to provide a disk drive capable of reducing vibrations of the disk generated by an airflow produced as the disk rotates.

The disk drive according to an aspect of the present invention comprises a rotary disk, a base for housing the disk, a top cover for closing the disk in the base to form an enclosure, a circulating filter arranged externally of the disk to trap dust within the enclosure, and an airflow guide for guiding an airflow which flows out of the circulating filter more to the center side than to the outer edge portion of the disk. In the structure as described, since an airflow from the circulating filter can flow along the disk surface, it is possible to prevent the airflow from contacting with the disk in the vicinity of the outer edge portion of the disk. This makes it possible to reduce vibrations of the disk generated by an airflow produced as the disk rotates.

Further, the airflow guide has a shut out portion provided in the vicinity of the outer edge portion of the disk to shut out an airflow which flows out in the neighborhood of the outer edge portion. Since it is possible to positively prevent the airflow from contacting with the disk in the vicinity of the outer edge portion of the disk, vibrations of the disk can be positively reduced.

The airflow guide has a guide portion arranged in the vicinity of the outer edge portion of the disk that projects on the center side of the disk. In this case, the airflow from the circulating filter can be guided to an airflow produced by rotation of the disk. Since it is possible to positively prevent the airflow from contacting with the disk in the vicinity of the outer edge portion of the disk, vibrations of the disk can be positively reduced.

The guide portion is curved in the rotating direction of an airflow generated as the disk rotates. In this case, the airflow from the circulating filter can be guided to an airflow produced by rotation of the disk. Since it is possible to further positively prevent the airflow from contacting with the disk in the vicinity of the outer edge portion of the disk, vibrations of the disk can be further positively reduced.

Preferably, the airflow guide guides an airflow which flows out of the circulating filter in the lower surface of the disk, or guides an airflow which flows out of the circulating filter between the upper surface of the disk and the lower surface of the top cover.

The disk drive further includes a plurality of the disks and a plurality of the airflow guides, and the plurality of airflow guides can guide the airflow between the plurality of disks. This can even cope with the case where the airflow generated by rotation of the disk becomes complicated.

A shut out portion is formed integral with the guide portion. Therefore, an airflow guide for straightening the airflow from the circulating filter and a shut out wall can be manufactured at low cost.

A disk drive according to another aspect of the present invention comprises: a disk, a base for housing the disk, a top cover for closing the disk in the base to form an enclosure, a spindle motor arranged in the vicinity of the center of the disk within the enclosure to rotate the disk, a circulating filter arranged externally of the disk to trap dust within the enclosure, an airflow guide including a shut out portion provided in the vicinity of the outer edge portion of the disk to shut out an airflow which flows out in the neighborhood of the outer edge portion, and a guide portion projecting from the shut out portion to the center side of the disk. In the structure as described, since an airflow from the circulating filter can flow along the disk surface, it is possible to prevent the airflow from contacting with the disk in the vicinity of the outer edge portion of the disk. This makes it possible to reduce vibrations of the disk generated by an airflow produced as the disk rotates.

According to the disk drive of the present invention, it is possible to reduce vibrations of the disk generated by the airflow produced as the disk rotates.

DETAILED DESCRIPTION OF THE INVENTION

The specific embodiments to which the present invention is applied will be hereinafter descried in detail with reference to the drawings. In this embodiment, the present invention is applied to a hard disk drive (HDD), which is, for example, 2.5" type high speed rotation and high track number (TPI: Tracks Per Inch).

EMBODIMENT 1

Figure 1:
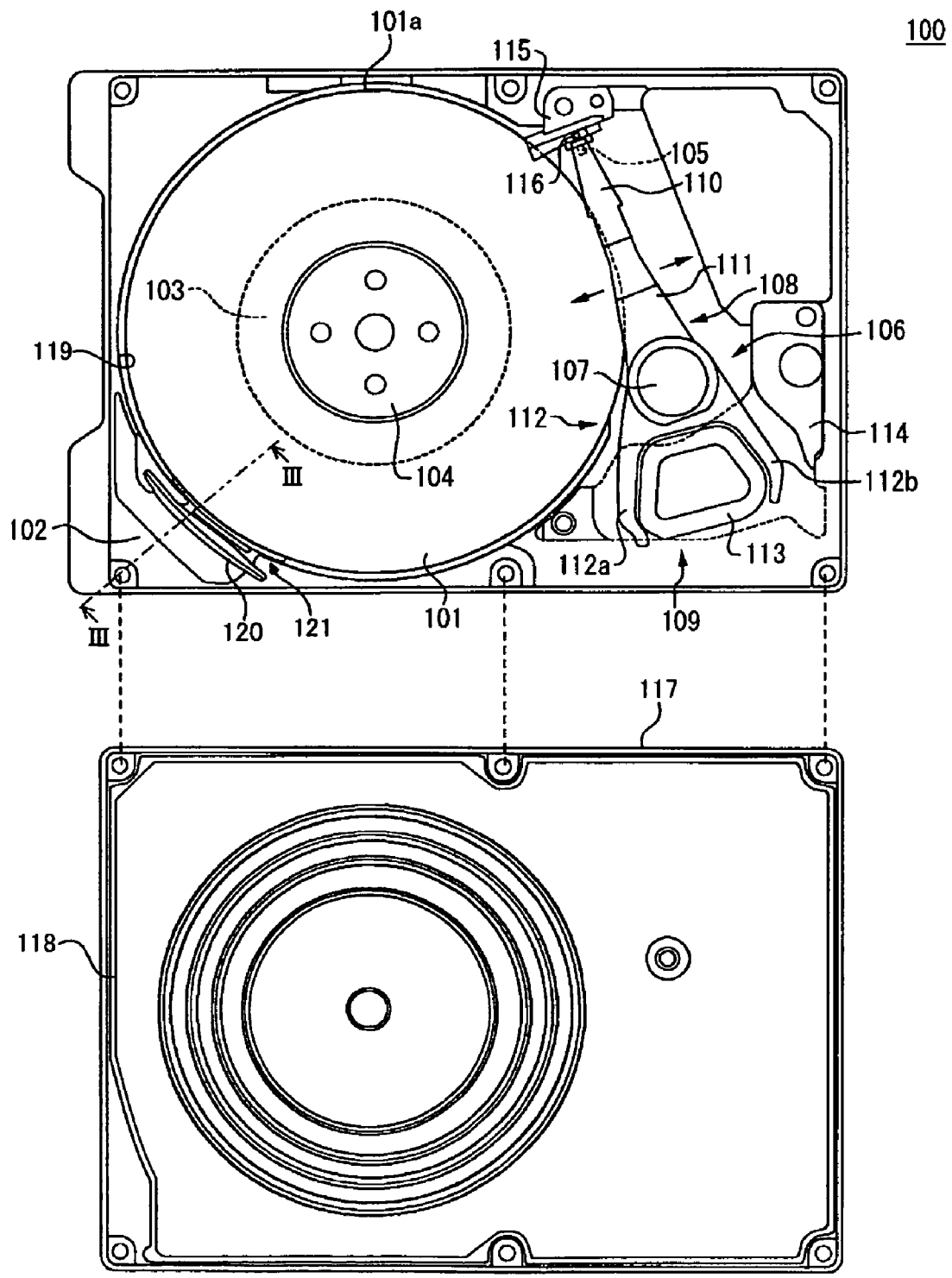
FIG. 1 is a top plan view showing the schematic structure of an HDD according to an embodiment of the present invention.

First, the schematic structure of HDD 100 according to the present invention is described. FIG. 1 is a top plan view showing the schematic structure of HDD 100. In FIG. 1, numeral 101 denotes a disk on which data is recorded, which is a non-volatile magnetic disk in which a magnetic layer is magnetized to thereby store data. Numeral 102 denotes a base for housing structural elements of the hard disk drive 100. The base 102 is fixed to a top cover 117 for closing an upper opening of the base 102 through a gasket 118 to thereby constitute a disk enclosure and house the structural elements of the hard disk drive 100 in the closed state.

In particular, in the base 102 of the present embodiment, a flow straightening wall 119 is formed substantially continuously along an outer edge portion of the magnetic disk 101 so that an airflow produced by rotation of the magnetic disk 101 flows smoothly. Specifically, as described later, the flow straightening wall 119 is formed along the outer edge portion 101a of the magnetic disk 101 except at a position at which an actuator arm 108 turns and an airflow guide 121 for an airflow which flows out of a circulating filter 120. The circulating filter 120 is arranged at a corner of the base 102, and an airflow produced according to rotation of the magnetic disk 101 flows into the corner. The circulating filter 120 collects dust contained in the airflow. The airflow having passed through the circulating filter 120 is discharged from the airflow guide 121. That is, the circulating filter 120 is a rotary circulating filter for collecting dust contained in an airflow circulating in the rotational direction of the magnetic disk 101. It is noted that the outer edge portion 101a of the magnetic disk 101 is an outer end surface of the magnetic disk 101. In other words, the outer edge portion 101a is a narrow surface with respect to a main surface surrounding the thin magnetic disk 101. Accordingly, the outer edge portion 101a is a surface discriminated from the main surface by the edge of the magnetic disk 101.

Numeral 103 denotes a spindle motor, and numeral 104 denotes a hub provided on the spindle motor 103. Numeral 105 denotes a head for performing write and/or read of data input and output to the magnetic disk 101 between a host (not shown) and the HDD 100. The head 105 (magnetic head) has a write element and/or a read element. The write element converts an electrical signal to a magnetic field according to storage data to the magnetic disk 101. The read element converts a magnetic field from the magnetic disk 101 to an electrical signal. The head 105 also includes a slider having the write element and/or the read element formed on the surface thereof. The collection of dust by the circulating filter 121 can prevent a head crash caused by dust attracting between the head 105 and the magnetic disk 101.

Numeral 106 is an actuator for holding and moving the head 105. The actuator 106 is supported to pivotally move about the pivot shaft 107. The actuator 106 includes the actuator arm 108 and a voice coil motor (VCM) 109 as a drive mechanism. The actuator arm 108 includes structural members connected in order of a suspension 110, a head arm 111, and a coil support 112 from an extreme end on which the head 105 is arranged.

Numeral 113 denotes a flat coil, and numeral 114 denotes an upper stator magnet holding plate fixed to the base 102. It is noted that the upper stator magnet holding plate 114 is shown with its main portion cutaway, the outer shape being shown by broken line, for the sake of convenience. Though not shown, under the flat coil 113 is arranged a lower stator magnet holding plate so as to put the flat coil 113 between the flat coil 113 and the upper stator magnet holding plate 114. The VCM 109 includes the flat coil 113, a stator magnet (not shown) fixed to the upper stator magnet holding plate 114, and a stator magnet (not shown) fixed to the lower stator magnet holding plate. Numeral 115 denotes a ramp mechanism used for unloading the head 105 from the magnetic disk 101 when rotation of the magnetic disk 101 stops. Numeral 116 denotes a tab formed at the extreme end of the suspension 110. It is noted that the actuator 106 may be also applied to a CSS (Contact Start and Stop) system in which the actuator 106 is withdrawn to a zone arranged in the inner circumference of the magnetic disk 101 when the head 105 does not perform data read/write.

The magnetic disk 101 is held integrally on the hub 104 of the spindle motor 103 fixed to the bottom surface of the base 102, and is driven for rotation at a predetermined speed by the spindle motor 103. When the hard disk drive 100 is not operated, the magnetic disk 101 stops rotating. The coil support 112 held to pivotally move about the pivot shaft 107 is formed with coil support arms 112*a*, 112*b*. The coil support arms 112*a*, 112*b* hold the flat coil 113 on the side opposite the head arm 111 with respect to the pivot shaft 107. The VCM 109 turns the actuator arm 108 about the pivot shaft 107 according to a drive signal sent to the flat coil 113 from a controller (not shown) to move the head 105 above the magnetic disk 101, or move the head 105 to the outside of the magnetic disk 101.

For read/write of data to/from the magnetic disk 101, the actuator 106 moves the head 105 above the data region of the surface of the rotating magnetic disk 101. The actuator 106 pivotally moves whereby the head 105 moves along the radial direction of the surface of the magnetic disk 101. Thus, the head 105 can access the desired track. Pressure caused by the viscosity of air between an ABS (Air Bearing Surface) of the slider and the rotating magnetic disk 101 becomes balanced with pressure applied in the direction of the magnetic disk 101 by the suspension 110, whereby the head 105 flies above the magnetic disk 101 at a constant gap.

There may occur problems that the rotation of the magnetic disk 101 stops, the head 105 comes in contact with the surface of the magnetic disk 101 and generates scratches data in the region and disablement of rotation of the magnetic disk due to the attraction phenomenon, and the like. To cope with the above problems, when the rotation of the magnetic disk stops, the actuator 106 causes the head 105 to be unloaded from the data region to the ramp mechanism 115. The actuator 106 pivotally moves in the direction of the ramp mechanism 115. Then the tab 116 at the extreme end of the actuator moves while slidably moving on the surface of the ramp mechanism 115 to ride on the parking surface of the ramp mechanism 115 whereby the head 105 is unloaded. For loading of the head 105, the actuator 106, supported on the parking surface, is disengaged from the ramp mechanism 115 to move above the surface of the magnetic disk 101.

The disk drive 100 includes a single disk or a plurality of disks, and either recording of one surface or double surfaces may be employed. In the case of double recording, a number of suspensions required for holding the head for scanning each recording surface are prepared in association with the recording surfaces. For one magnetic disk 101, one suspension is combined with the other suspension 110 at the coil support 112 through the head arm at a position superposed with a predetermined space. Further, where a plurality of magnetic disks are subjected to double storing, a plurality of magnetic disks are integrally held by the hub 104 with a predetermined space in the direction of the rotating shaft of the spindle motor 103. Suspensions for holding the head for scanning the storage surfaces are prepared by the number of storage surfaces, which are fixed to the coil support 112 through the head arm 111 at a position superposed in a predetermined space with respect to the suspension 110 in FIG. 1.

Figure 2:
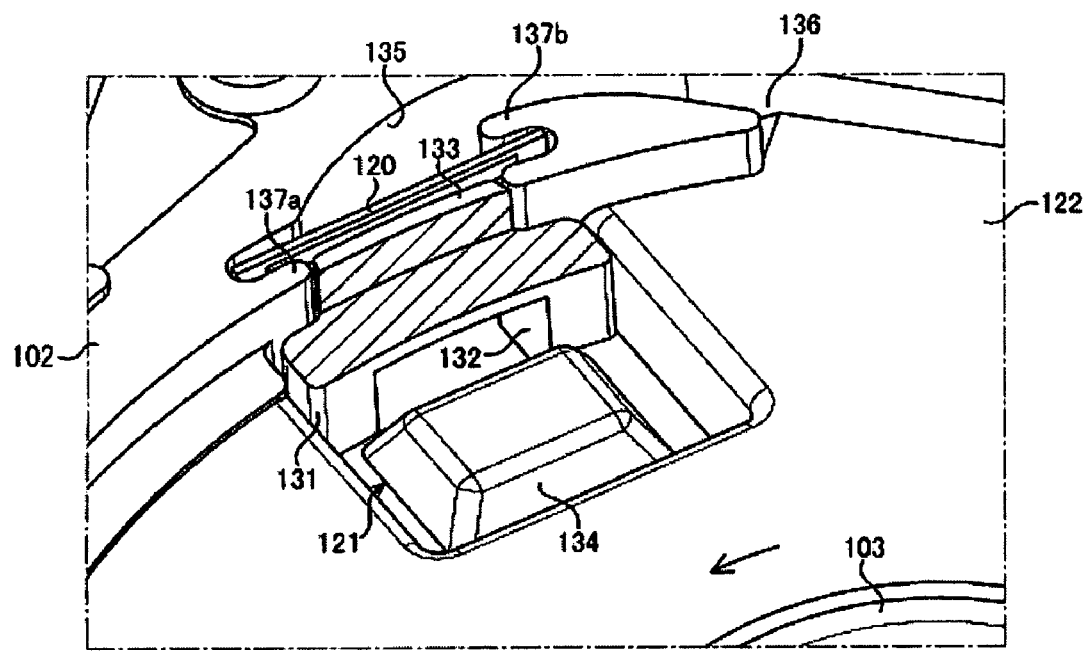
FIG. 2 is a perspective view showing an airflow guide arranged in a base of the HDD according to an embodiment of the present invention.
Figure 3:
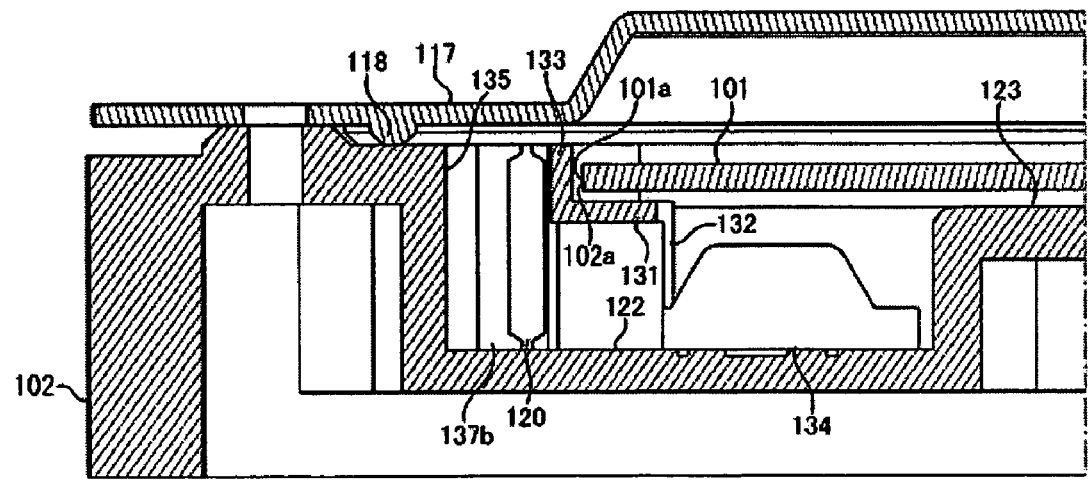
FIG. 3 is a sectional view showing an airflow guide arranged in a base of the HDD according to an embodiment of the present invention.
Figure 4:
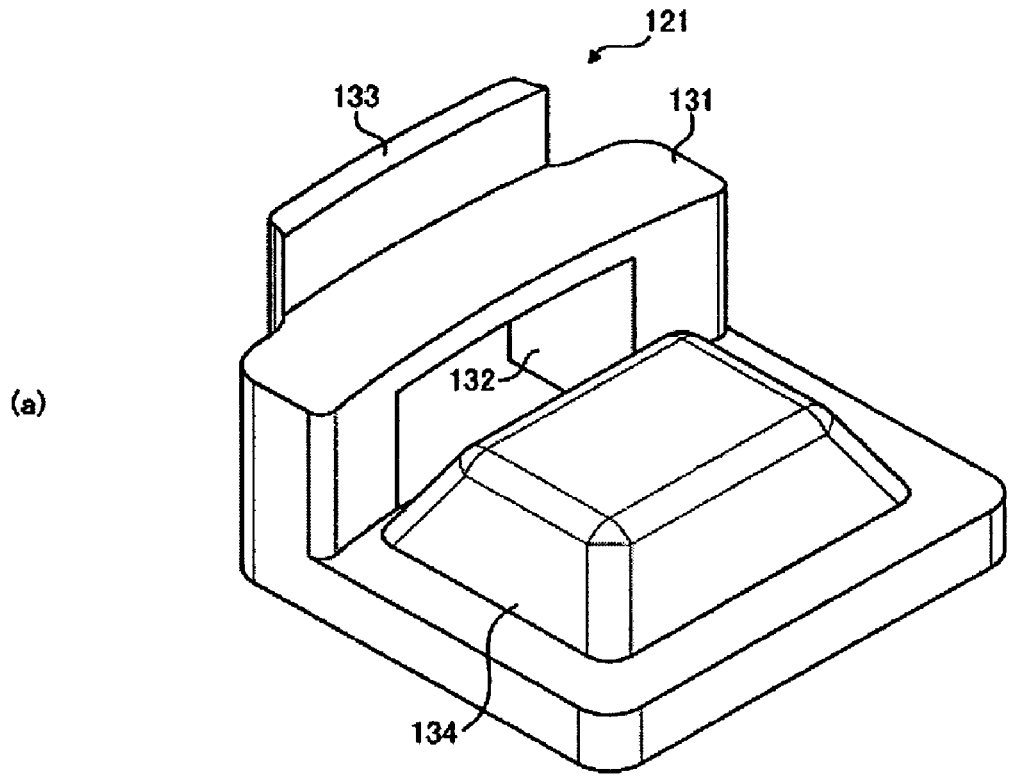
FIGS. 4(a) and 4(b) are perspective views showing an airflow guide in the HDD according to an embodiment of the present invention.
Figure 4:
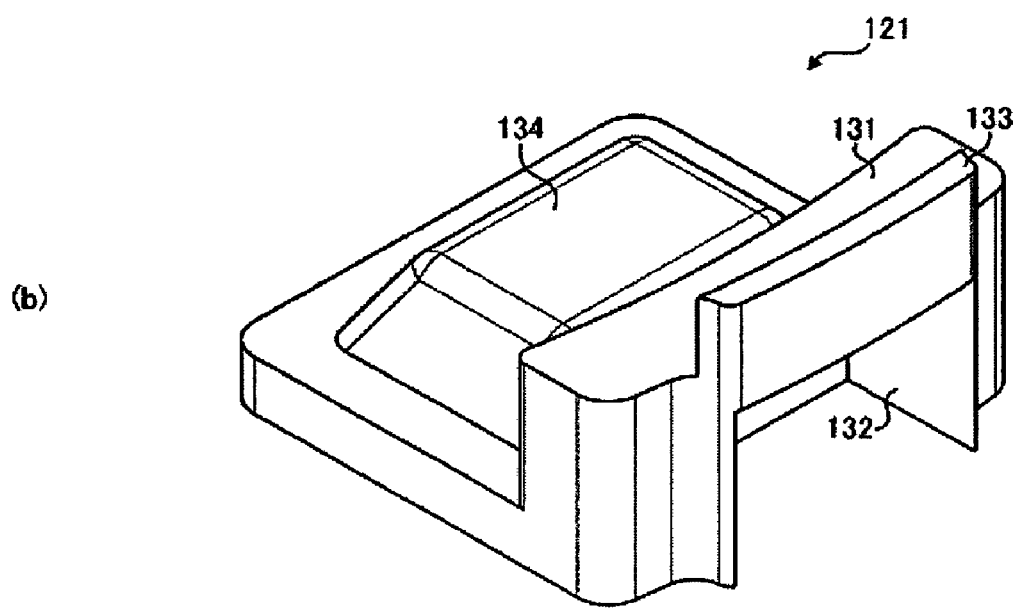
Figure 5:
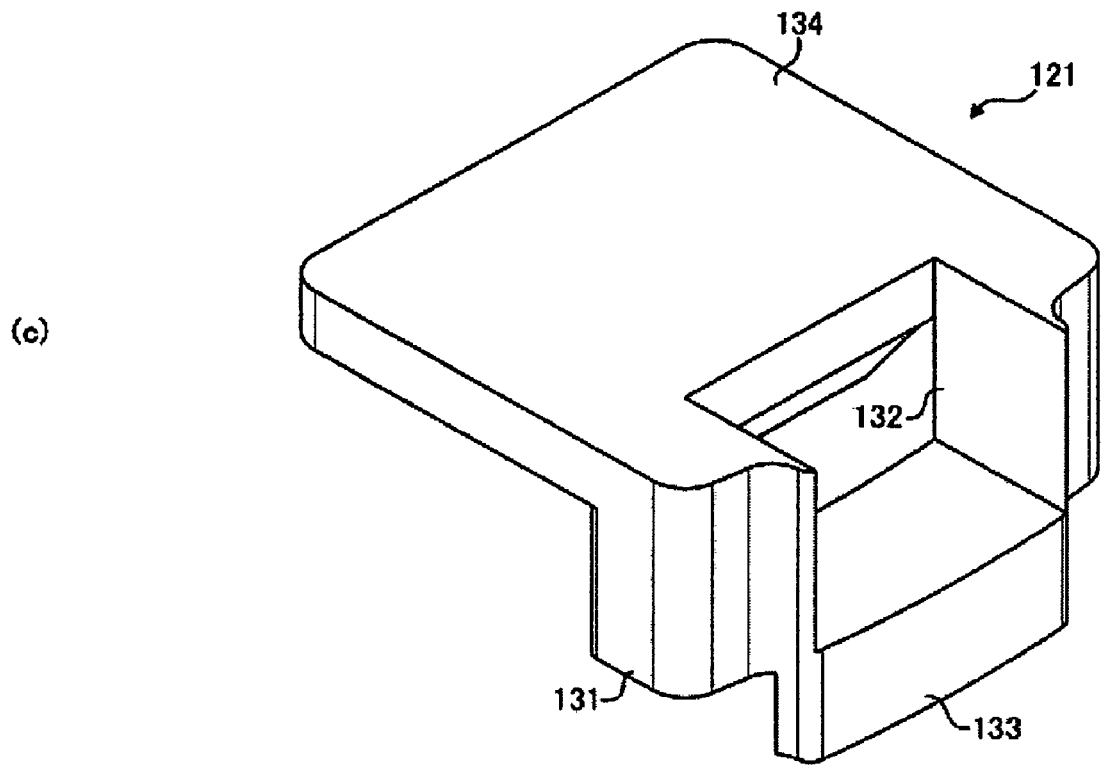
FIGS. 5(c) and 5(d) are perspective views showing an airflow guide in the HDD according to an embodiment of the present invention.
Figure 5:
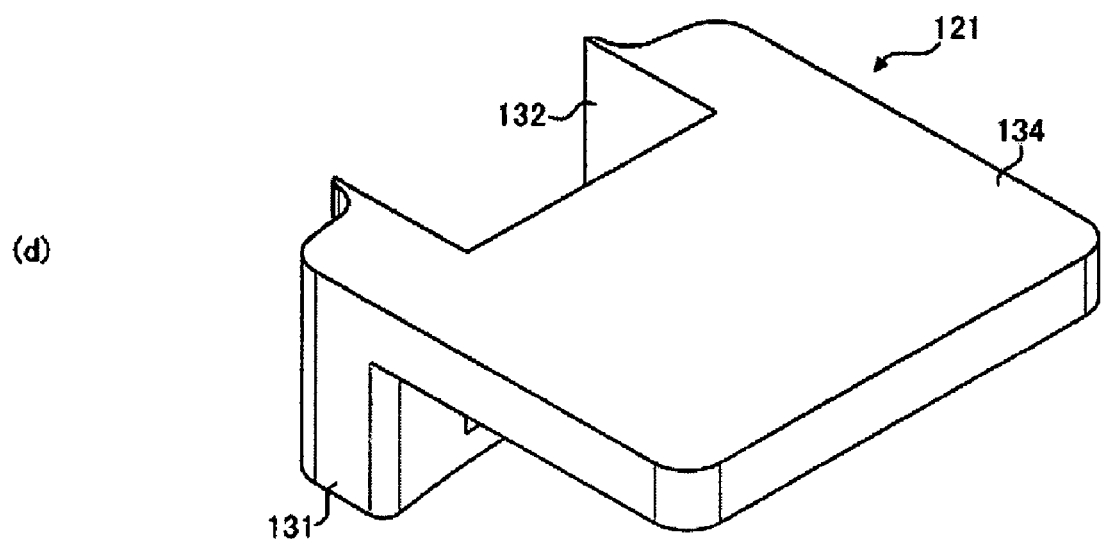

The HDD 100 according to the present embodiment will be described hereinafter further in detail with reference to FIGS. 2 to 5. FIG. 2 is a perspective view showing, in enlarged form, a circulating filter portion for trapping dust within an enclosure of an HDD to maintain a degree of cleaning thereof. FIG. 3 is a sectional view of the circulating filter portion taken along line III-III in FIG. 1. It is noted that in FIG. 2, the magnetic disk 101 is omitted so as to easily see the circulating filter portion of HDD 100 in the present embodiment.

As described above, the base 102 of the HDD 100 is provided with a recess (housing portion) 122 that is substantially the same in shape as the outer shape of the magnetic disk 101. A single magnetic disk 101 is arranged in the housing portion 122. In FIGS. 2 and 3, a single magnetic disk is housed in the housing portion 122; however a plural number of the magnetic disks 101 may be housed without limiting thereto.

In the present embodiment, the disk rotates in the direction of the arrow. Here, the bottom surface of the housing portion 122 corresponds to the bottom surface of the base 102, which is however formed to be higher than the bottom surface of a housing portion 123 on which the actuator arm 108 is arranged. This is due to the following. The closer to the magnetic disk 101 the bottom surface of the housing portion 122 for placing the magnetic disk 101, that is, the smaller the distance between the lowermost surface of the magnetic disk 101 and the bottom surface of the housing portion 123 opposed to the lowermost surface, the more vibration caused by an airflow produced by rotation of the magnetic disk 101 is suppressed.

Further, the side wall (flow straightening wall 119) of the housing portion 122 of the magnetic disk 101 is formed so as to be opposed along the outer edge portion 101*a* of the magnetic disk 101. With the provision of the flow straightening wall 119, the turbulence of an airflow mainly generated in the periphery of the outer edge portion 101*a* by rotation of the magnetic disk 101 is suppressed, and the influence of the vibration produced in the magnetic disk 101 due to the turbulence of airflow is suppressed. Accordingly, to cause the airflow generated in the periphery of the outer edge portion 101*a* of the magnetic disk 101 to flow smoothly, preferably, the flow straightening wall 119 is formed continuously over the whole region of the outer edge portion 101*a* of the magnetic disk 101.

A gap 102*a* is provided between the flow straightening wall 119 and the outer edge portion 101*a* of the magnetic disk 101 so as for the flow straightening wall 119 not to disturb the rotation of the magnetic disk 101. Therefore, the airflow having passed through the circulating filter 120 flows into the upper surface of the magnetic disk 101 through the gap 102*a* from the lower part of the magnetic disk 101. That is, there is generated an airflow moving upward via the gap 102*a* in the vicinity of the outer edge portion 101*a* of the magnetic disk 101. With the rising airflow, the operation of the magnetic disk 101 vibrates up and down to generate flutter in the magnetic disk 101. When TPI of the magnetic disk 101 becomes narrow with the increasing recording capacity of the magnetic disk 101, the influence of the vibration of the magnetic disk becomes great. Accordingly, the vibration must be reduced as much as possible.

In view of such a circumstance as described, the present inventors have studied earnestly in order to reduce the rising airflow as much as possible. As a result, they found that where the airflow guide 121 is provided for guiding the airflow which flows out of the circulating filter 120 more toward the center side (inside) than to the outer edge portion 101a of the magnetic disk 101, the flutter can be reduced. Further, the present inventors found that even if the airflow moving upward via the gap 102a in the vicinity of the outer edge portion 101a of the magnetic disk 101 is shielded, its outflow amount is substantially small, and thereby a flowing-in airflow is reduced. As a result, the dust collecting effect is not affected much thereby.

FIGS. 4(a) and 4(b), and FIGS. 5(c) and 5(d) are schematic views showing the airflow guide 121 in the present embodiment. Now, the airflow guide 121 will be described while suitably referring to FIG. 2. FIG. 4(a) is a perspective view observed in the direction similar to FIG. 2, and FIG. 4(b) is a perspective view observed in the back direction with respect to FIG. 4(a) (rear, or outer edge side of the base 102). Further, FIG. 5(c) is a perspective view observed from the lower part (bottom surface side of the base 102) with respect to FIGS. 4(a) and 4(b), and FIG. 5(d) is a perspective view observed in the back direction (rear, or outer edge side of the base 102) with respect to FIG. 5(c).

As shown in FIGS. 4(a) and 4(b), and FIGS. 5(c) and 5(d), a guide portion 131 of the airflow guide 121 has an arch-like shape. The arch-like recess constitutes an outlet 132. That is, the airflow guide 121 is fixed to the bottom surface of the base 102 so that the guide portion 131 may form an arch upright, whereby the outlet 132 is formed by the recess of the guide portion 131, as shown in FIG. 2.

As shown in FIG. 2, the outlet 132 is provided at least downward of the lower surface of the magnetic disk 101. In more detail, the outlet 132 is provided so that the upper surface of the guide portion 131 is arranged downward of the lower surface of the magnetic disk 101 so that the upper surface of the guide portion 131 may not disturb the rotation of the magnetic disk 101. In other words, the upper surface of the guide portion 131 is disposed at substantially the same plane as the plane to which the magnetic disk 101 is fixed, or somewhat lower than the plane to which the magnetic disk 101 is fixed (near the bottom surface of the base 102). Further, where a plurality of magnetic disks 101 are mounted, the upper surface of the guide portion 131 is provided downward of the lower surface of the magnetic disk 101 arranged closest to the bottom side of the base 102 (hereinafter, referred to as the lowermost surface).

The guide portion 131 has the thickness in the vertical direction with respect to the direction depressed arch-like. That is, the outlet 132 formed by the depression (recess) of the guide portion 131 extends tunnel-like. As shown in FIG. 2, the guide portion 131 is fixed to the base 102 so as to project substantially parallel with the recording surface of the magnetic disk 101. In other words, the guide portion 131 projects substantially parallel with the surface to which the magnetic disk 101 is fixed, and the outlet 132 extends along the recording surface (fixed surface) of the magnetic disk 101. Accordingly, the guide portion 131 guides the airflow passing through the circulating filter 120 to an airflow along the lower surface of the magnetic disk 101.

As shown in FIGS. 4(a) and 4(b), and FIGS. 5(c) and 5(d), a shut out portion 133 is a shut out wall having an approximately plate-like shape. The shut out portion 133 is fixedly mounted on the upper portion of the guide portion 131 in the narrow side. The airflow guide 121 is fixed to the base 102 so that the shut out portion 133 stands upright. In other words, the shut out portion 133 extends in the depressing direction of the arch-like guide portion 131, while the guide portion 131 extends in the direction substantially vertical to the projecting direction. As shown in FIG. 2, the shut out portion 133 provided on the guide portion 131 constitutes a flow straightening wall linked to the flow straightening wall 119 above the guide portion 131. An upper surface of the shut out portion 133 is disposed along the upper surface of the flow straightening wall 119. Accordingly, the shut out portion 133 shuts out above the conventional outlet, and closes the outlet 132 so that the outlet 132 formed by the guide portion 131 assumes a predetermined height. Further, the surface of the shut out portion 133 facing the outer edge portion 101a of the magnetic disk 101 is made to have a smooth shape along the shape of the outer edge portion 101a of the magnetic disk 101 so that the flow straightening wall 119 is made as continuous as possible together with the shut out portion 133. In more detail, the whole surface of the shut out portion 133 is disposed so as to be connected smoothly to the surface of the flow straightening wall 119.

A filter case 134 into which the circulating filter is inserted is provided on the lower end of the guide portion 131 of the airflow guide 121. This filter case 134 is projected with respect to the extending direction of the outlet 132 of the guide portion 131. More specifically, the filter case 134 is fixedly mounted on the side opposite the shut out portion 133. The circulating filter within the filter case 134 is, for example, a substantially rectangular plate-like filter. The circulating filter forms an airflow in upper and lower directions when an airflow which flows in from a through-hole (not shown) formed in the bottom portion of the base 102 passes through up and down. Such an airflow guide 121 as described can be integrally formed with the shut out portion 133, the guide portion 131, and the filter case 134. More specifically, the integrally formed airflow guide 121 can be manufactured at low cost using a predetermined mold by casting or the like, leading to reduction in the manufacturing cost for the airflow guide 121.

Further, as shown in FIG. 2, the flow straightening wall 119 is formed with a fitting recess 135 into which the airflow guide 121 is fitted. The airflow guide 121 is fitted in the fitting recess 135 so that the guide portion 131 projects in the center direction of the magnetic disk 101. In other words, the airflow guide 121 is fitted in the fitting recess 135 at the back surface of the shut out portion 133. An opening is formed at the end of the fitting recess 135, being discontinuous at that position. This opening serves as an inlet 136 into which an airflow to be discharged out of the outlet 132 flows. The circulating filter 120 is arranged between the inlet 136 and the outlet 132 within the fitting recess 135 to collect dust contained in the airflow which flows in from the inlet 136. To hold the circulating filter 120 from both sides, holding projections 137a and 137b projected from the side wall of the base 102 are provided.

Figure 6:
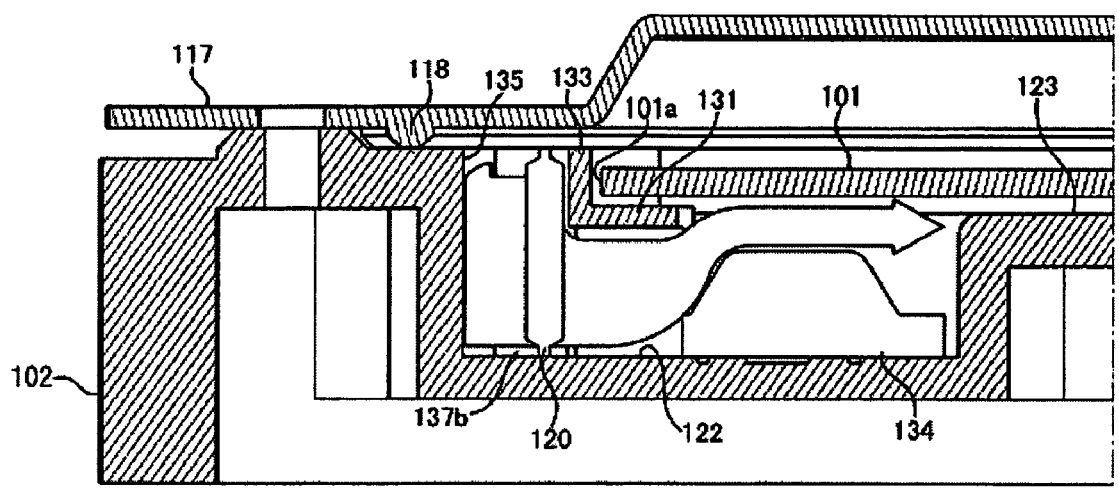
FIG. 6 is a schematic view showing the airflow which flows in from an inlet of an airflow guide and flows out of an outlet in the HDD according to an embodiment of the present invention.
Figure 7:
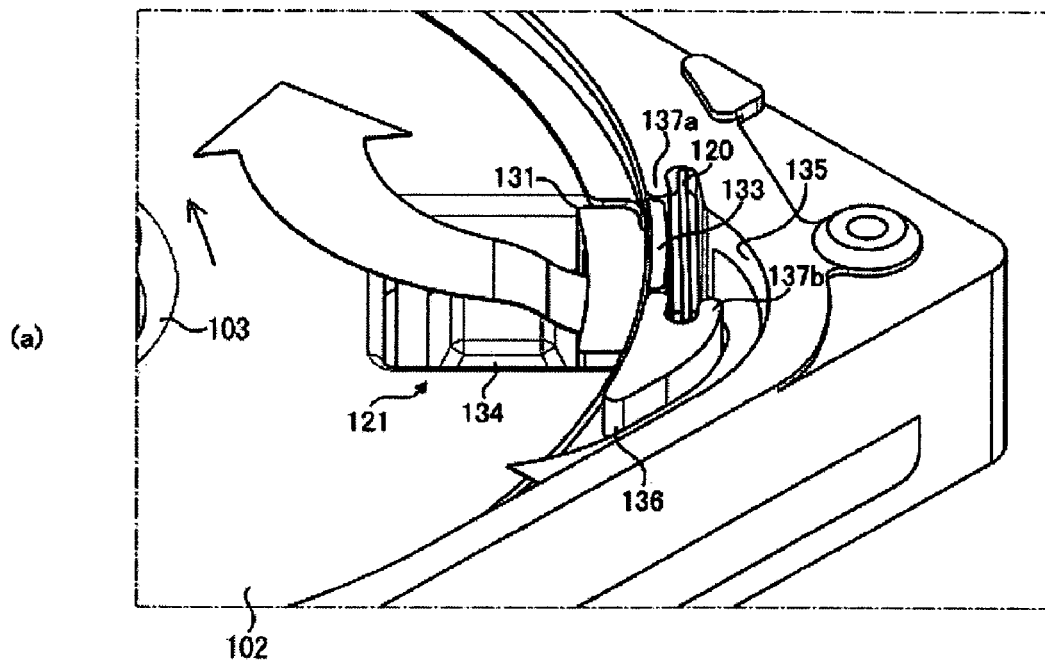
FIGS. 7(a) and 7(b) are schematic views showing the airflow which flows in from an inlet of an airflow guide and flows out of an outlet in the HDD according to an embodiment of the present invention.
Figure 7:
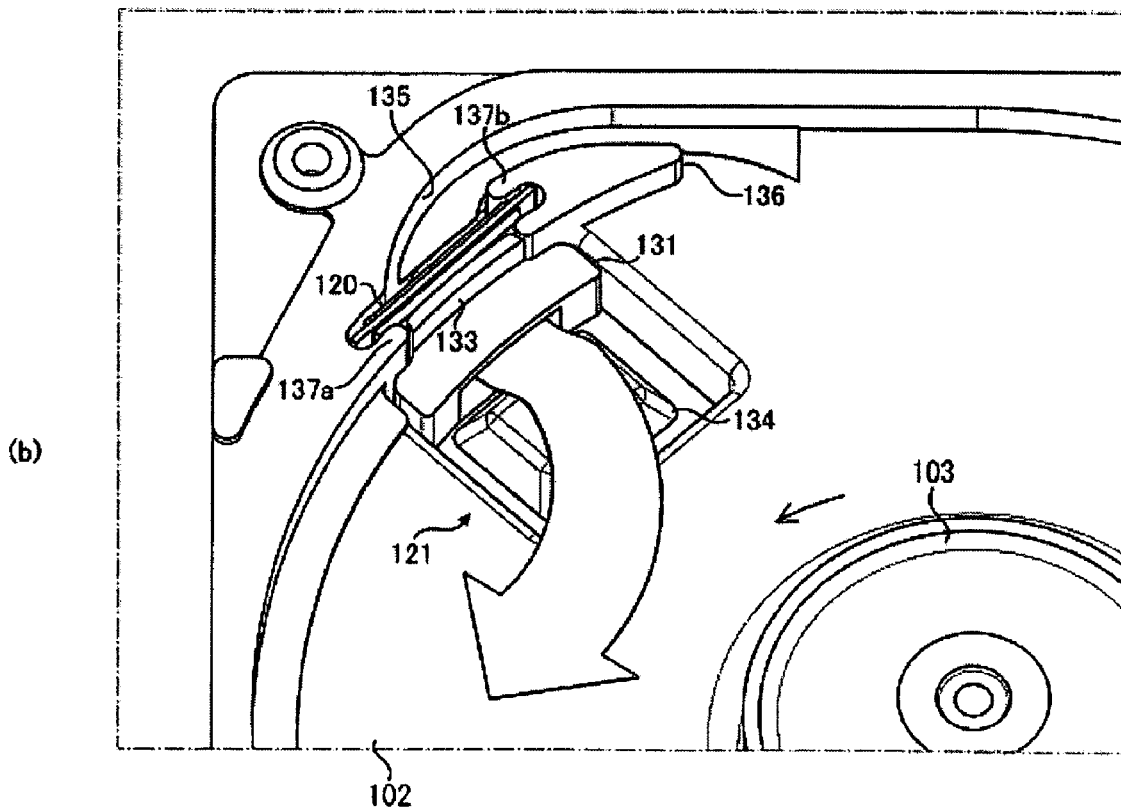

FIG. 6 and FIGS. 7(a) and 7(b) are drawings explaining the status that an airflow which flows in from the inlet 136 flows out of the airflow guide 121 through the circulating filter 120. FIG. 6 is a sectional view, and FIGS. 7(a) and 7(b) are perspective views. The airflow produced by the rotating magnetic disk 101 flows in from the inlet 136, dust is trapped by the circulating filter 120, and a purified airflow flows out of the outlet 132 of the airflow guide 121. At this time, since the upper surface of the guide portion 131 of the airflow guide 121 is disposed downward of the lower surface of the magnetic disk 101, the outlet 132 is positioned downward of the lower surface of the magnetic disk 101. Further, the shut out portion 133 of the airflow guide 121 prevents the airflow having passed through the circulating filter 120 from flowing out into the gap 102a in the vicinity of the outer edge portion 101a of the magnetic disk 101. Therefore, this can prevent the airflow from rising via the gap 102a in the vicinity of the outer edge portion 101a of the magnetic disk 101, thereby enabling to suppress vibration of the magnetic disk 101. Further, since the guide portion 131 of the airflow guide 121 projects in the center direction of the magnetic disk 101, the airflow discharged out of the outlet 132 is guided toward the center of the magnetic disk 101. Therefore, the airflow having passed through the circulating filter 120 can be guided easily toward the center of the magnetic disk 101, thereby preventing the airflow from rising via the gap 102a in the vicinity of the outer edge portion 101a of the magnetic disk 101. Accordingly, the flutter of the magnetic disk 101 caused by the rising airflow is suppressed.

EMBODIMENT 2

Figure 8:
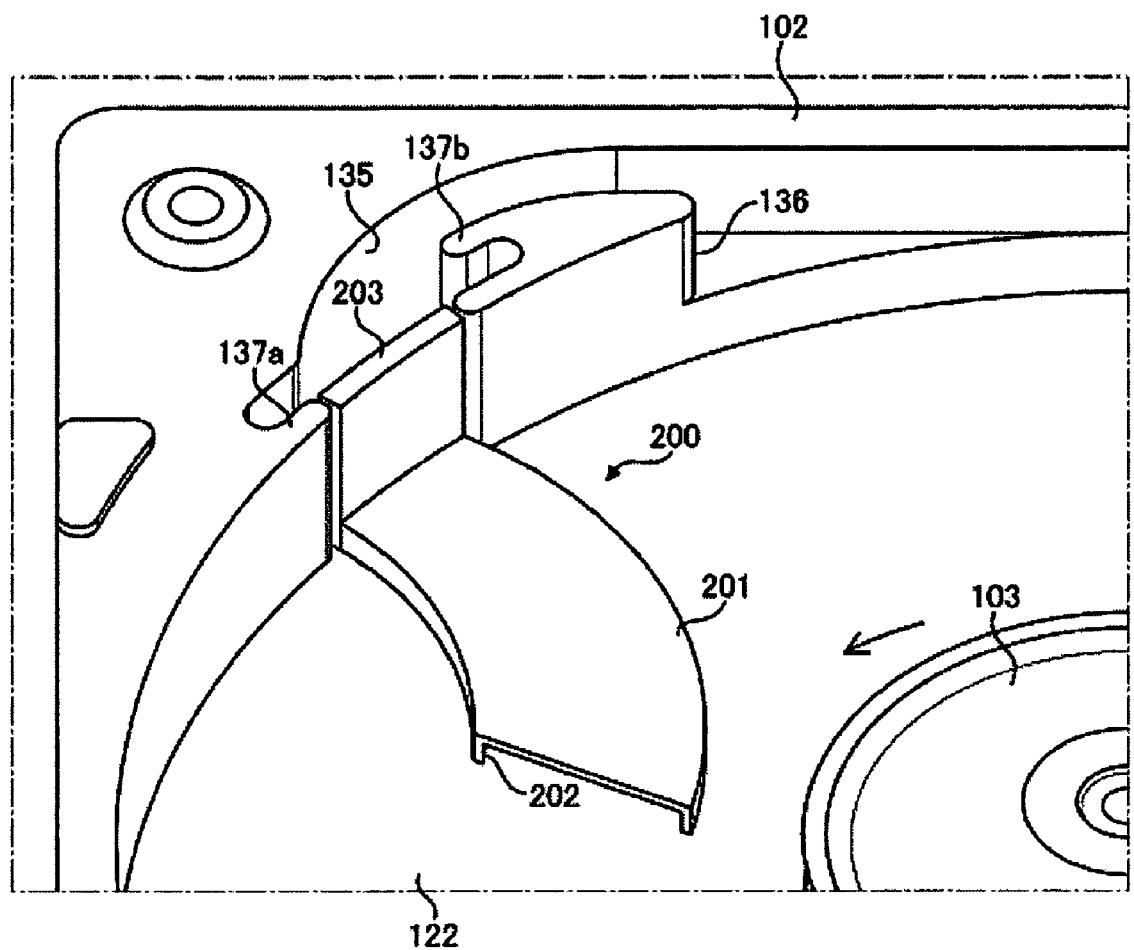
FIG. 8 is a perspective view showing how another airflow guide is arranged in a base of the HDD according to an embodiment of the present invention.

An airflow guide 200 in Embodiment 2 of the invention is shown in FIG. 8. As shown in FIG. 8, a guide portion 201 of the airflow guide 200 extends in the center direction of the magnetic disk 101 as compared with the guide portion 131. Further, this guide portion 201 is curved toward the rotational direction of the magnetic disk 101. That is, since the airflow is generated in the rotational direction of the magnetic disk 101, the guide portion 201 is curved in the direction of the airflow. Therefore, the airflow is guided along the outlet 202 of the guide portion 201, and can be guided in the rotational direction of the airflow generated by rotation of the magnetic disk 101. Further, a shut out portion 203 prevents an airflow from the circulating filter 120 from flowing out the gap 102a in the vicinity of the outer edge portion 101a of the magnetic disk 101.

As described above, the guide portion 201 of the airflow guide 200 is curved in the rotational direction of the airflow, whereby the airflow having passed through the circulating filter 120 can be easily guided to the airflow generated in the lower surface of the magnetic disk 101. This makes it possible to prevent the airflow having passed through the circulating filter 120 from rising via the gap 102a in the vicinity of the outer edge portion 101a of the magnetic disk 101 and suppress the flutter of the magnetic disk 101. Further, an opening width of the guide portion 201 as seen in FIG. 8 is shown to be narrow as compared with an opening width of the guide portion 131. Since an opening width of the arch-like guide portion 201 is not particularly limited, it is designed according to the desired outflow amount of airflow, the collecting effect of dust, and the like.

EMBODIMENT 3

Figure 9:
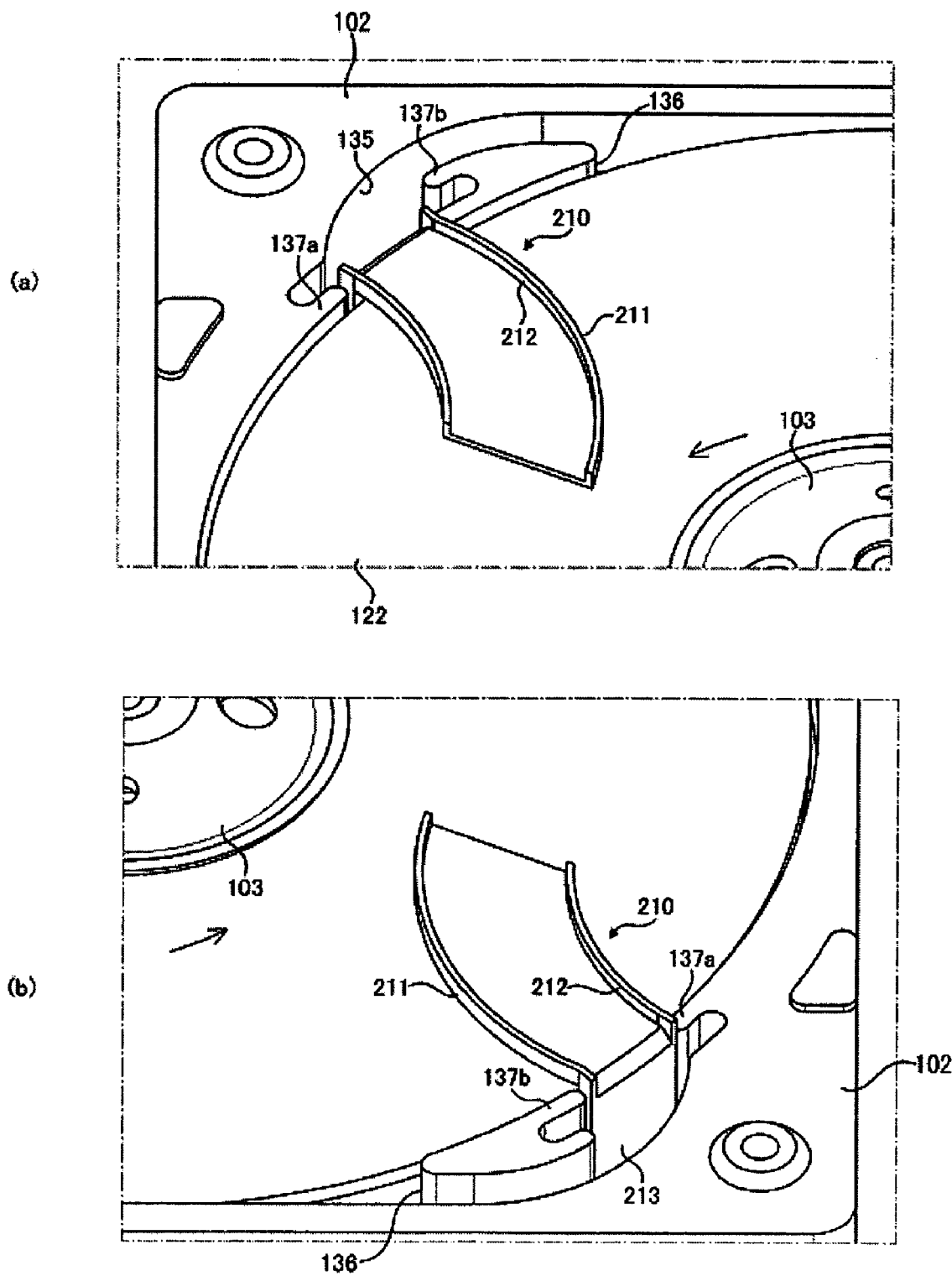
FIGS. 9(a) and 9(b) are perspective views showing how another airflow guide is arranged in a base of the HDD according to an embodiment of the present invention.

Although, in Embodiment 1 of the Invention, the airflow is guided by the airflow guide 121 in the lower surface of the magnetic disk 101, an airflow may be guided in the upper surface of the magnetic disk 101. An airflow guide 210 in the present embodiment is shown in FIGS. 9(a) and 9(b). In the upper surface of the magnetic disk 101, an airflow which rotates as the magnetic disk 101 rotates is generated between the upper surface of the magnetic disk 101 and the lower surface of the top cover 117. The rotational direction of the airflow is the same as that of the magnetic disk 101. As shown in FIGS. 9(a) and 9(b), a guide portion 211 of the airflow guide 210 guides an airflow to the upper surface of the magnetic disk 101 to discharge the airflow from an outlet 212. Thus, the guide portion 211 guides the airflow from the circulating filter 120 to an airflow which rotates in the rotational direction of the magnetic disk 101 between the upper surface of the magnetic disk 101 and the top cover 117. At this time, a shut out portion 213 prevents the airflow from the circulating filter 120 from flowing out to the gap 102a in the vicinity of the outer edge portion 101a of the magnetic disk 101.

As described above, even if the airflow is guided to the upper surface of the magnetic disk 101, the airflow does not pass the gap 102a in the vicinity of the outer edge portion 101a of the magnetic disk 101. Therefore, it is possible to prevent the magnetic disk 101 from being guided by the airflow, and to obtain the effect of suppression of flutter. The projecting end of the guide portion 211 shown in FIGS. 9(a) and 9(b) is directed in the rotational direction of the airflow on the upper surface of the magnetic disk 101, similar to the guide portion 201 in Embodiment 2 of the invention. Accordingly, also in the guide portion 211, the effect similar to the guide portion 201 can be obtained.

EMBODIMENT 4

Figure 10:
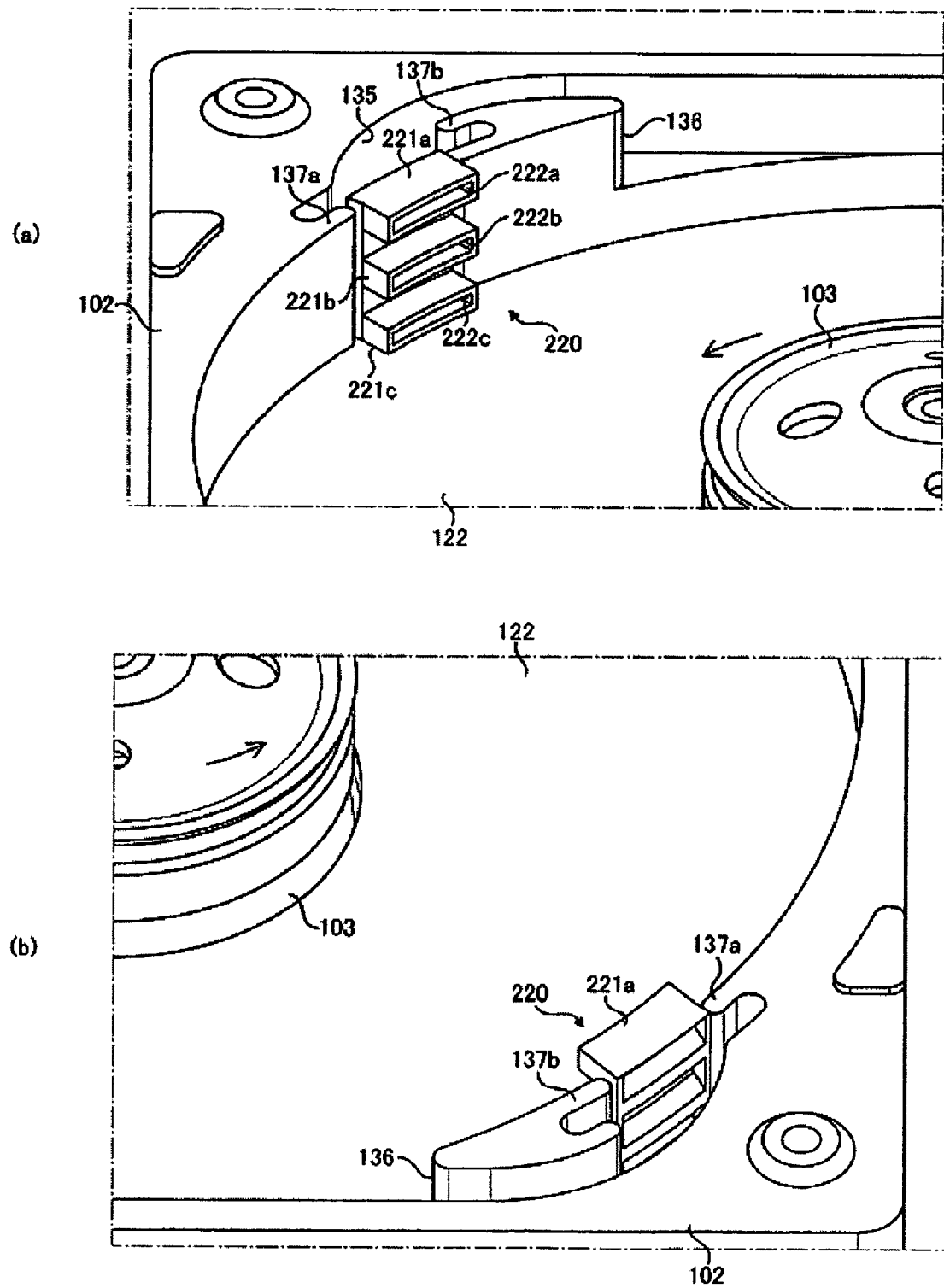
FIGS. 10(a) and 10(b) are schematic views showing how another airflow guide is arranged in a base of the HDD according to an embodiment of the present invention.

An airflow guide 220 in Embodiment 4 of the invention is shown in FIGS. 10(a) and 10(b). The airflow guide 220 shown in FIGS. 10(a) and 10(b) is used for an HDD 100 provided with a plurality of magnetic disks (not shown in FIGS. 10(a) and 10(b)). More specifically, the airflow guide 220 is provided with a plurality of tubular guide portions 221a, 221b, and 221c, which are arranged between the top and bottom (between the base 102 and the top cover 117). The tubular guide portions 221a, 221b, and 221c are formed with outlets 222a, 222b, and 222c, respectively. A portion where the guide portions 221a, 221b, and 221c are connected to each other functions as a shut out portion, the outlets 222a, 222b, and 222c being not included therein. A single magnetic disk is arranged between the guide portions 221a, 221b and between the guide portions 221b, 221c, respectively. Further, while the airflow guide 220 in the present embodiment is not provided with the shut out portion, the guide portion 221a is provided on the uppermost stage. It is noted that a shut out portion similar to the shut out portion 133 may be provided on the uppermost stage without being limited to the arrangement described above.

As described above, the airflow having passed through the circulating filter 120 can be guided between the magnetic disks 101 by the plurality of guide portions 221a, 221b and 221c, thereby allowing the airflow not to pass through the gap 102a of the outer edge portion 101a of each magnetic disk. Therefore, even if the plurality of magnetic disks are used, flutter of the magnetic disks can be suppressed. In particular, since the guide portions 221a, 221b, and 221c in the present embodiment each have a tubular shape, the airflow from the circulating filter 120 can be guided positively to the center side of the magnetic disks.

EMBODIMENT 5

Figure 11:
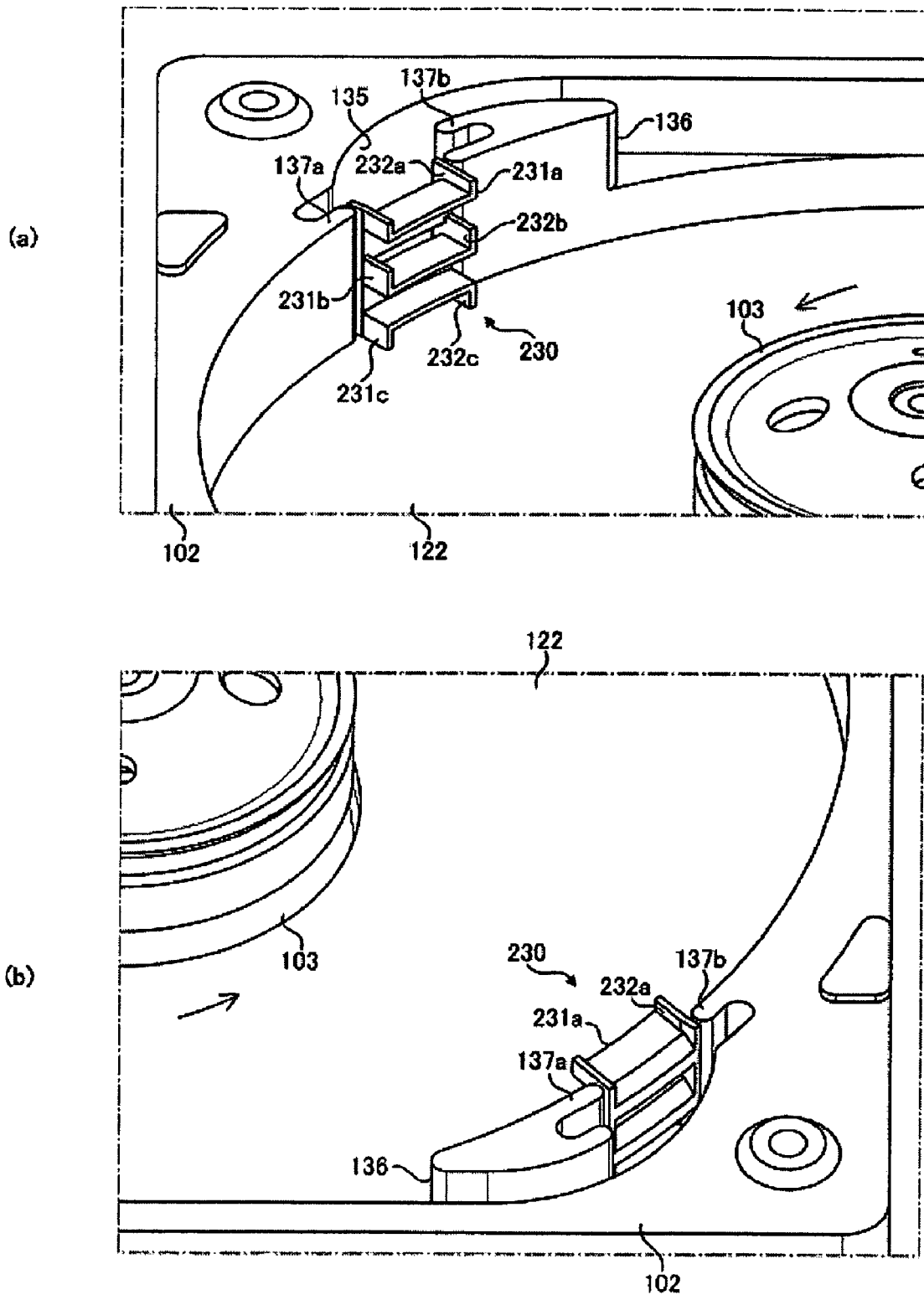
FIGS. 11(a) and 11(b) are schematic views showing how another airflow guide is arranged in a base of the HDD according to an embodiment of the present invention.
Figure 12:
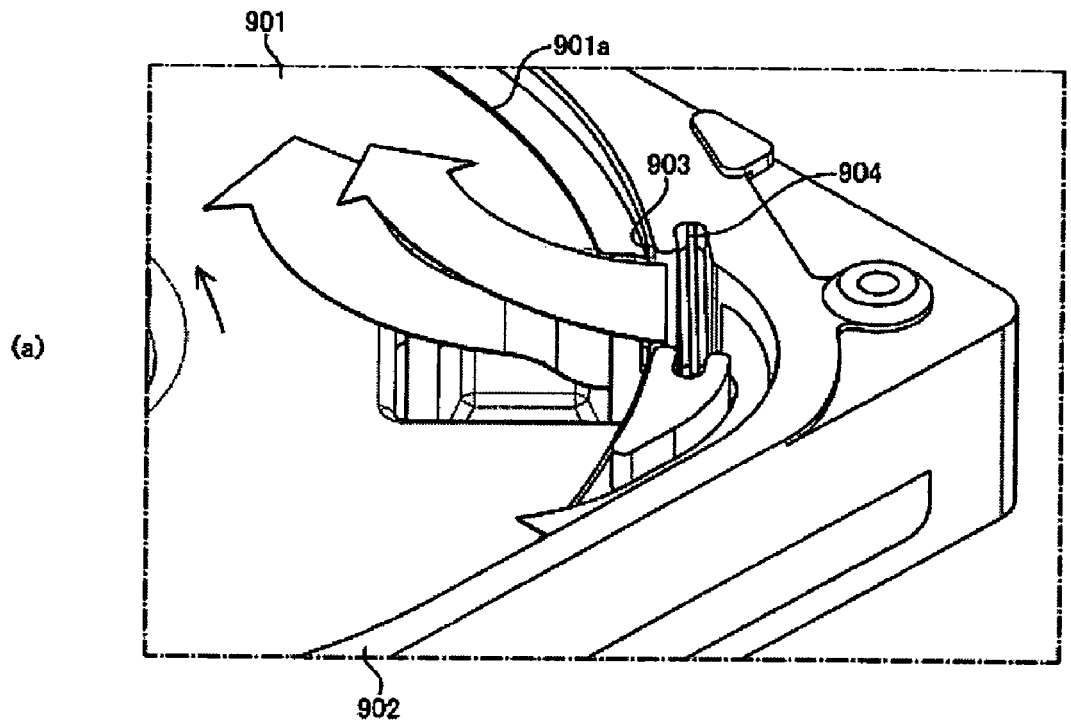
FIGS. 12(a) and 12(b) are schematic views showing the airflow which flows in from an inlet and flows out of an outlet in the conventional HDD.
Figure 12:
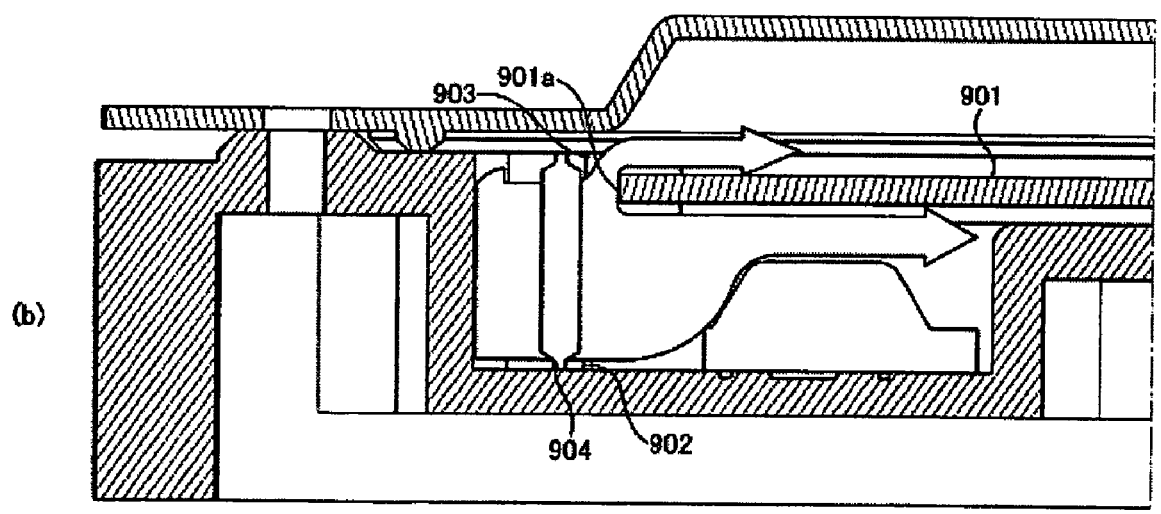

While the guide portions 221a, 221b and 221c in Embodiment 4 each have a tubular shape, it is noted that a shape is not limited thereto but any shape may be adopted as long as an airflow can be guided more to the center than to the outer edge portion 101a of the magnetic disks. An airflow guide 230 in the present embodiment is shown in FIGS. 11(a) and 11(b). Guide portions 231a, 231b, and 231c of the airflow guide 230 do not have a tubular shape. Each of the guide portions 231a, 231b, and 231c has a tray-like shape without the upper surface or lower surface. The tray-like guide portions 231a, 231b, and 231c are formed with outlets 232a, 232b, and 232c, respectively. Further, a portion where the guide portions 231a, 231b, and 231c are connected to each other functions as a shut out portion, the outlets 232a, 232b, and 232c being not included therein. Even if the airflow guide 230 having the structure as described above is used, the effect similar to those of the above-described embodiments can be obtained, and the flutter of the magnetic disk can be suppressed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
   a rotary disk;
   a base for housing said disk;
   a top cover for closing said disk in said base to form an enclosure;
   a circulating filter arranged externally of said disk to trap dust within said enclosure, and
   an airflow guide curved in a direction of a flow of air as the disk rotates, and configured to guide an airflow which flows out of said circulating filter more to a center side than to an outer edge portion of said disk, outside of a spindle hub supporting the disk.

2. The disk drive according to claim 1, wherein said airflow guide has a shut out portion provided in the vicinity of the outer edge portion of said disk to shut out an airflow which flows out in the neighborhood of said outer edge portion.

3. The disk drive according to claim 2, wherein said airflow guide has a guide portion arranged in the vicinity of the outer edge portion of said disk and projecting on the center side of said disk.

4. The disk drive according to claim 3, wherein said guide portion is curved in the rotating direction of an airflow generated as said disk rotates.

5. The disk drive according to claim 4, wherein said airflow guide guides an airflow which flows out of said circulating filter in a lower surface of said disk.

6. The disk drive according to claim 4, wherein said airflow guide guides an airflow which flows out of said circulating filter between an upper surface of said disk and the lower surface of said top cover.

7. The disk drive according to claim 4, wherein a shut out portion is formed integral with said guide portion.

8. The disk drive according to claim 3, wherein said airflow guide guides an airflow which flows out of said circulating filter in a lower surface of said disk.

9. The disk drive according to claim 3, wherein said airflow guide guides an airflow which flows out of said circulating filter between an upper surface of said disk and the lower surface of said top cover.

10. The disk drive according to claim 3, wherein a shut out portion is formed integral with said guide portion.

11. The disk drive according to claim 2, wherein said airflow guide guides an airflow which flows out of said circulating filter in a lower surface of said disk.

12. The disk drive according to claim 2, wherein said airflow guide guides an airflow which flows out of said circulating filter between an upper surface of said disk and the lower surface of said top cover.

13. The disk drive according to claim 1, wherein said airflow guide guides an airflow which flows out of said circulating filter in a lower surface of said disk.

14. The disk drive according to claim 1, wherein said airflow guide guides an airflow which flows out of said circulating filter between an upper surface of said disk and the lower surface of said top cover.

15. The disk drive according to claim 1, wherein said airflow guide has a guide portion arranged in the vicinity of the outer edge portion of said disk and projecting on the center side of said disk.

16. The disk drive according to claim 1, comprising a plurality of said disks and a plurality of said airflow guides, said plurality of airflow guides guiding said airflow between said plurality of disks.

17. A disk drive comprising:
    a disk;
    a base for housing said disk;
    a top cover for closing said disk in said base to form an enclosure;
    a spindle motor arranged in the vicinity of a center of said disk within said enclosure to rotate said disk;
    a circulating filter arranged externally of said disk to trap dust within said enclosure, and
    an airflow guide including a shut out portion provided in the vicinity of an outer edge portion of said disk to shut out an airflow which flows out in the neighborhood of said outer edge portion, and a guide portion curved in the rotating direction of an airflow generated a said disk rotates, the guide portion projecting from said shut out portion to the center side of said disk outside of a spindle hub supporting the disk.

18. The disk drive according to claim 17, wherein said airflow guide guides an airflow which flows out of said circulating filter in a lower surface of said disk.

19. The disk drive according to claim 17, wherein said airflow guide guides an airflow which flows out of said circulating filter between an upper surface of said disk and the lower surface of said top cover.

20. The disk drive according to claim 17, wherein a shut out portion is formed integral with said guide portion.

* * * * *

UNITED STATES PATENT AND TRADEMARK OFFICE
CERTIFICATE OF CORRECTION

PATENT NO. : 7,589,932 B2
APPLICATION NO. : 11/317187
DATED : September 15, 2009
INVENTOR(S) : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twenty-first Day of September, 2010

David J. Kappos
*Director of the United States Patent and Trademark Office*